United States Patent
Zhong et al.

(10) Patent No.: US 10,634,226 B2
(45) Date of Patent: Apr. 28, 2020

(54) MODULAR ELECTRIC LINEAR ACTUATOR FACILITATING ASSEMBLY AND DISASSEMBLY

(71) Applicant: Dongguan Tomuu Actuator Technology Co., Ltd., Dongguan (CN)

(72) Inventors: Hanwan Zhong, Fujian (CN); Ming Liu, Hubei (CN)

( * ) Notice: Subject to any disclaimer, the term of this patent is extended or adjusted under 35 U.S.C. 154(b) by 0 days.

(21) Appl. No.: 16/182,628

(22) Filed: Nov. 7, 2018

(65) Prior Publication Data

US 2019/0072161 A1  Mar. 7, 2019

(30) Foreign Application Priority Data

Aug. 8, 2018 (CN) .......................... 2018 1 0894825

(51) Int. Cl.
*F16H 25/20* (2006.01)
*H02K 7/06* (2006.01)

(52) U.S. Cl.
CPC .............. *F16H 25/20* (2013.01); *H02K 7/06* (2013.01); *F16H 2025/209* (2013.01); *F16H 2025/2031* (2013.01); *H02K 2213/12* (2013.01)

(58) Field of Classification Search
CPC ... F16H 25/20; F16H 2025/2031; H02K 7/06; H02K 2213/12
See application file for complete search history.

(56) References Cited

U.S. PATENT DOCUMENTS

| | | | | |
|---|---|---|---|---|
| 2,724,978 A * | 11/1955 | Morrell | ................... | F16K 31/05 74/425 |
| 2,925,170 A * | 2/1960 | Rath | ................... | B23K 9/1336 226/174 |
| 3,408,881 A * | 11/1968 | Grube | ................... | B61H 13/04 74/505 |
| 4,226,136 A * | 10/1980 | Porter | ...................... | F16H 1/16 74/416 |
| 6,032,550 A * | 3/2000 | Rugh | ........................ | F16H 1/16 74/425 |
| 8,770,063 B2 * | 7/2014 | Bhatti | .................. | F16H 57/032 74/424.71 |
| 2003/0213324 A1 * | 11/2003 | Eberle | ....................... | F16D 1/02 74/425 |
| 2005/0040715 A1 * | 2/2005 | Nesic | ..................... | H02K 11/38 310/71 |
| 2009/0145254 A1 * | 6/2009 | Hirabayashi | ............. | B25J 9/103 74/425 |
| 2012/0240707 A1 * | 9/2012 | Pachov | .................... | B66D 1/14 74/425 |

* cited by examiner

*Primary Examiner* — David M Fenstermacher
(74) *Attorney, Agent, or Firm* — Prakash Nama; Global IP Services, PLLC

(57) ABSTRACT

The present invention relates to the field of linear actuators, and in particular, to a modular electric linear actuator facilitating assembly and disassembly. The modular electric linear actuator of the present invention mainly includes components such as a motor group, a screw group, an inner tube group, an outer tube group, and pins. The components are fixed through clamping or the pins, so that installation using screw bolts is avoided. By adopting the modular assembly manner, the disassembly is convenient, and the assembly is fast, so that less labor is required, and the production cost is reduced. Moreover, the pins are used for fixing in the end, so that the stability of the entire structure is ensured.

6 Claims, 1 Drawing Sheet

MODULAR ELECTRIC LINEAR ACTUATOR FACILITATING ASSEMBLY AND DISASSEMBLY

BACKGROUND OF THE INVENTION

The present invention relates to the field of linear actuators, and in particular, to a modular electric linear actuator facilitating assembly and disassembly.

An electric linear actuator, also known as a linear driver, is a novel linear actuation mechanism that mainly includes a motor linear actuator, a control apparatus, etc. Its main working principle is that the motor drives a lead screw to rotate. A drive nut is disposed on the lead screw, which is driven to reciprocate when the lead screw rotates, while a worm gear-worm mechanism is usually used between the motor and the lead screw to implement transmission. A common electric linear actuator uses the worm gear and worm for transmission. In particular, a worm on a gear of a motor actuates a worm gear to rotate, so as to enable a small lead screw in the worm gear to make an axial movement, and a connecting plate drives a limiting rod to make a corresponding axial movement. When a required travel is reached, a limiting block is adjusted to press a travel switch to cut off power, and the motor stops running.

However, components of an existing electric linear actuator are all assembled and fixed through screw bolts. Various components are involved, and the assembly and disassembly are troublesome. As a result, more labor and a longer assembly time are required, and the production cost is increased.

BRIEF SUMMARY OF THE INVENTION

To resolve the foregoing problem, the present invention provides a modular electric linear actuator facilitating assembly and disassembly. Components do not need to be fixed by using screw bolts, and component groups are assembled in a simple and fast manner.

To achieve the foregoing objective, the technical solution used in the present invention is: A modular electric linear actuator facilitating assembly and disassembly includes a motor group, a screw group, an inner tube group, an outer tube group, and pins, wherein an opening is provided at an end of the inner tube group, a first accommodating cavity communicating with the opening is provided inside the inner tube group, a screw of the screw group is inserted in the first accommodating cavity of the inner tube group through the opening, a penetrating second accommodating cavity is provided in the outer tube group, the inner tube group is inserted in the second accommodating cavity of the outer tube group, a sleeve ring is disposed at the position of an opening of the outer tube group, through holes are provided at upper and lower sides of the sleeve ring, a fixing ring is disposed at an end of the motor group, the fixing ring is provided with a groove corresponding to the sleeve ring and is further provided with through holes corresponding to the through holes of the sleeve ring, the sleeve ring of the outer tube group is inserted in the groove, and the pins penetrate through the corresponding through holes of the fixing ring and the sleeve ring to fix the outer tube group and the motor group.

Further, the motor group includes a motor, a gearbox cover, and a gearbox body, wherein a rotating shaft of the motor penetrates into the gearbox body through a through hole, an end of the screw group is disposed in the gearbox body and is in drive connection with the rotating shaft of the motor, and the gearbox cover and the gearbox body are clamped and fixed.

Further, the modular electric linear actuator facilitating assembly and disassembly further includes a joint, wherein a clamping hole is provided between the gearbox cover and the gearbox body, and the joint is clamped to an end portion of the screw group through the clamping hole.

Further, the screw group includes the screw and a gear, the gear is sleeved over an end of the screw, spiral teeth are fixedly disposed on the rotating shaft of the motor, the gear is meshed with the spiral teeth, and the motor drives the gear and brings the screw to rotate.

The sleeve ring is sleeved over an end of the opening of the outer tube group, and the fixing ring is sleeved over an end of the motor group.

Further, through holes corresponding to positions of the through holes of the sleeve ring are further provided on two sides of the position of the opening of the outer tube group, and through holes corresponding to the through holes of the fixing ring in position are provided at an end of the motor group.

The beneficial effects of the present invention lie in that: the modular electric linear actuator of the present invention mainly includes components such as a motor group, a screw group, an inner tube group, an outer tube group, and pins. The components are fixed through clamping or the pins, so that installation using screw bolts is avoided. By adopting the modular assembly manner, the disassembly is convenient, and the assembly is fast, so that less labor is required, and the production cost is reduced. Moreover, the pins are used for fixing in the end, so that the stability of the entire structure is ensured.

Figure 1:
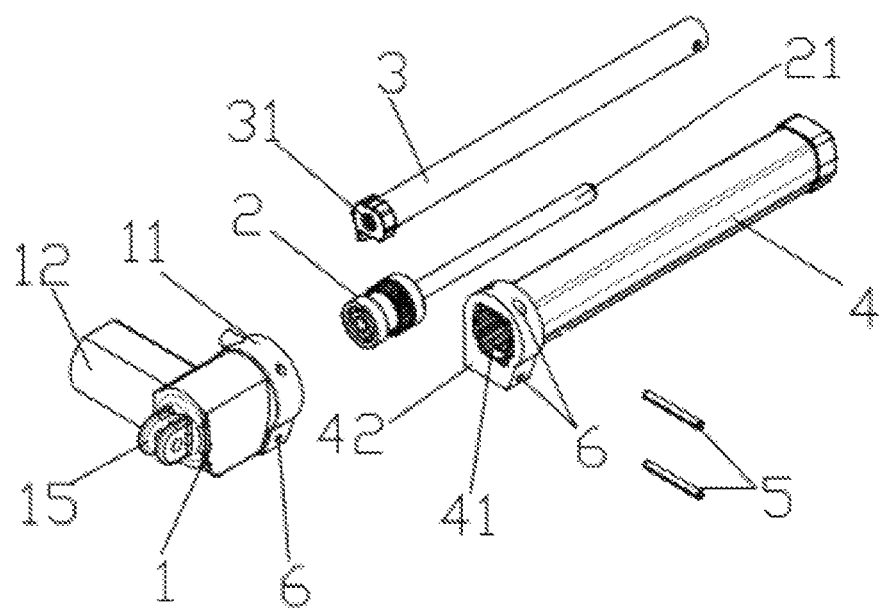
FIG. 1 is a structural assembly view according to the present invention.

Reference Numerals: 1. motor group; 11. fixing ring; 12. motor; 121. spiral teeth; 13. gearbox cover; 14. gearbox body; 15. joint; 2. screw group; 21. screw; 22. gear; 3. inner tube group; 31. first accommodating cavity; 4. outer tube group; 41. second accommodating cavity; 42. sleeve ring; 5. pin; 6. through hole; and 7. clamping groove.

DETAILED DESCRIPTION OF THE INVENTION

To make the technical problems resolved by the present invention, the technical solutions, and the beneficial effects clearer and more comprehensible, the present invention is further described below in detail with reference to the accompanying drawings and embodiments. It should be understood that the specific embodiments described herein are merely illustrative of the present invention and are not intended to limit the present invention.

Figure 2:
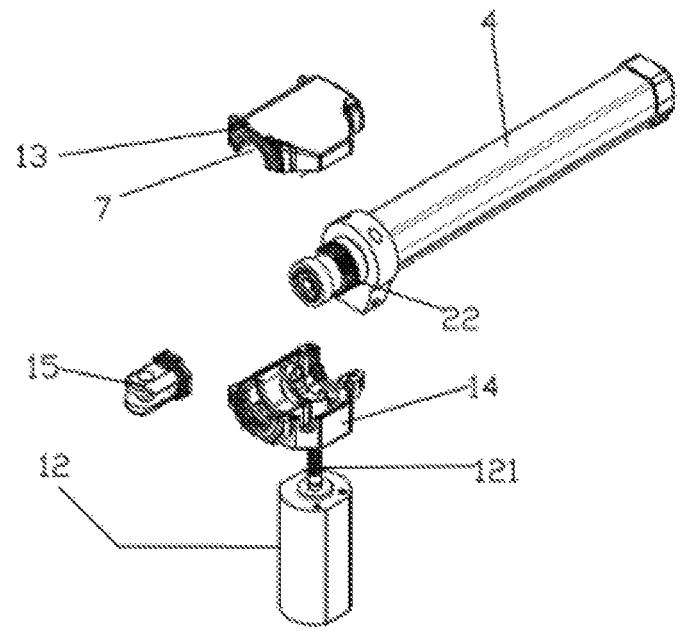
FIG. 2 is a structural assembly view of a motor group according to this specific embodiment.

Referring to FIG. 1 and FIG. 2, the present invention relates to a modular electric linear actuator facilitating assembly and disassembly, including a motor group 1, a screw group 2, an inner tube group 3, an outer tube group 4, and pins 5. An opening is provided at an end of the inner tube group 3. A first accommodating cavity 31 communicating with the opening is provided inside the inner tube group 3. A screw 21 of the screw group 2 is inserted in the first accommodating cavity 31 of the inner tube group 3 through the opening. A penetrating second accommodating cavity 41 is provided at an end of the outer tube group 4. The inner tube group 3 is inserted in the second accommodating cavity 41 of the outer tube group 4. A sleeve ring 42 is disposed at the position of an opening of the outer tube group 4. Through holes 6 are provided at upper and lower sides of the sleeve ring 42. A fixing ring 11 is disposed at an end of the motor group 1. The fixing ring 11 is provided with a groove corresponding to the sleeve ring 42, and is further provided with through holes 6 corresponding to the through holes 6 of the sleeve ring 42. The sleeve ring 42 of the outer tube group 4 is inserted in the groove. The pins 5 penetrate through the corresponding through holes 6 of the fixing ring 11 and the sleeve ring 42 to fix the outer tube group 4 and the motor group 1.

Compared with the prior art, the modular electric linear actuator of the present invention mainly includes components such as the motor group 1, the screw group 2, the inner tube group 3, the outer tube group 4, and the pins 5. The components are fixed through clamping or the pins, so that installation using screw bolts is avoided. By adopting the modular assembly manner, the disassembly is convenient, and the assembly is fast, so that less labor is required, and the production cost is reduced. Moreover, the pins 5 are used for fixing in the end, so that the stability of the entire structure is ensured.

It is also possible to replace the pin fixing manner with a clamping manner, so that the sleeve ring 42 and the fixing ring 11 are fixed.

Further, the motor group 1 includes a motor 12, a gearbox cover 13, and a gearbox body 14. A rotating shaft of the motor 12 penetrates into the gearbox body 14 through a through hole. An end of the screw group 2 is disposed in the gearbox body 14 and is in drive connection with the rotating shaft of the motor 12. The gearbox cover 13 and the gearbox body 14 are clamped and fixed. The modular electric linear actuator facilitating assembly and disassembly further includes a joint 15. A clamping hole is provided between the gearbox cover 13 and the gearbox body 14. The joint 15 is clamped to an end portion of the screw group 2 through the clamping hole.

By using the foregoing solution, the gearbox cover 13 and the gearbox body 14 of the motor group 1 are fixed by clamping. Corresponding clamping grooves 7 are provided on a side of the gearbox cover 13 and of the gearbox body 14. A clamping hole is formed between the clamping grooves 7. The joint 15 is clamped and fixed to the end portion of the screw group 2 through the clamping hole formed between the clamping groove 7 of the gearbox cover 13 and the clamping groove 7 of the gearbox body 14. Thus, the components are assembled and disassembled conveniently.

Further, the screw group 2 includes the screw 21 and a gear 22. The gear 22 is sleeved over an end of the screw 21. Spiral teeth 121 are fixedly disposed on the rotating shaft of the motor 12. The gear 22 is meshed with the spiral teeth 121. The motor 12 drives the gear 22 and brings the screw 21 to rotate.

By using the foregoing solution, the motor 12 and the screw 21 are meshed together in the gearbox body 14 through the gear 22 and the spiral teeth 121.

Further, the sleeve ring 42 is sleeved over an end of the opening of the outer tube group 4. The fixing ring 11 is sleeved over an end of the motor group 1. With the foregoing structure, the sleeve ring 42 and the outer tube group 4 are sleeved and fixed. The fixing ring 11 is sleeved over an end of the gearbox cover 13 and the gearbox body 14 of the motor group 1. The sleeve ring 42 and the fixing ring 11 are then fixed through insertion. Next, the sleeve ring 42 and the fixing ring 11 are further clamped and fixed through the pins 5, thereby ensuring the overall firmness.

In this implementation, through holes corresponding to the through holes 6 of the sleeve ring 42 in position may be further provided on two sides of the position of the opening of the outer tube group 4. The gearbox cover 13 and the gearbox body 14 of the motor group 1 are provided with through holes corresponding to the through holes 6 of the fixing ring 11 in position, so that the pins 5 can at the same time pass through the fixing ring 11, the gearbox body 14, the sleeve ring 42, and the outer tube group 4, thereby ensuring the stability of the entire structure.

A process of assembling the modular electric linear actuator in this embodiment is as follows:

1. The screw 21 of the screw group 2 is first inserted in the first accommodating cavity 31 of the inner tube group 3. The inner tube group 3 is then inserted in the second accommodating cavity 41 of the outer tube group 4. After that, the sleeve ring 42 is sleeved over at the end of the opening of the outer tube group 4.

2. A spiral rod 121 on the rotating shaft of the motor 12 is inserted in the gearbox body 14 through a through hole. The gear 22 at an end of the screw group 2 is then placed in the gearbox body 14 and is meshed with the spiral rod 121. A clamping portion at an end of the joint 15 is then clamped and fixed to the end portion of the screw group 2. Finally, after the gearbox cover 13 and the gearbox body 14 are closed, the fixing ring 11 is sleeved over an end of the closed gearbox body 14.

3. The sleeve ring 42 at an end of the outer tube group 4 is inserted in the groove corresponding to the fixing ring 11. The pins 5 are finally inserted in the corresponding through holes 6 of the fixing ring 11 and the sleeve ring 42, so that the sleeve ring 42 and the fixing ring 11 are fixed thus connecting the outer tube group 4 with the motor group 1.

The foregoing is merely description of preferred embodiments of the present invention but is not intended to limit the scope of the present invention. Various variations and improvements made to the technical solutions of the present invention by ordinary skilled in the art without departing from the design spirit of the present invention shall fall within the protection scope as defined by the claims of the present invention.

What is claimed is:

1. A modular electric linear actuator facilitating assembly and disassembly, comprising a motor group, a screw group, an inner tube group, an outer tube group, and pins, wherein an opening is provided at an end of the inner tube group, a first accommodating cavity communicating with the opening is provided inside the inner tube group, a screw of the screw group is inserted in the first accommodating cavity of the inner tube group through the opening, a penetrating second accommodating cavity is provided in the outer tube group, the inner tube group is inserted in the second accommodating cavity of the outer tube group, a sleeve ring is disposed at the position of an opening of the outer tube group, through holes are provided at upper and lower sides of the sleeve ring, a fixing ring is disposed at an end of the motor group, the fixing ring is provided with a groove corresponding to the sleeve ring, and the fixing ring is further provided with through holes corresponding to the through holes of the sleeve ring, the sleeve ring of the outer tube group is inserted in the groove, and the pins penetrate through the corresponding through holes of the fixing ring and the sleeve ring to fix the outer tube group and the motor group.

2. The modular electric linear actuator facilitating assembly and disassembly according to claim 1, wherein the motor group comprises a motor, a gearbox cover, and a gearbox body, a rotating shaft of the motor penetrates into the gearbox body through a through hole, an end of the screw group is disposed in the gearbox body and is in drive connection with the rotating shaft of the motor, and the gearbox cover and the gearbox body are clamped and fixed.

3. The modular electric linear actuator facilitating assembly and disassembly according to claim 2, further comprising a joint, wherein a clamping hole is provided between the gearbox cover and the gearbox body, and the joint is clamped to an end portion of the screw group through the clamping hole.

4. The modular electric linear actuator facilitating assembly and disassembly according to claim 2, wherein the screw group comprises the screw and a gear, the gear is sleeved over an end of the screw, spiral teeth are fixedly disposed on the rotating shaft of the motor, the gear is meshed with the spiral teeth, and the motor drives the gear and the gear drives the screw to rotate.

5. The modular electric linear actuator facilitating assembly and disassembly according to claim 1, wherein the sleeve ring is sleeved over an end of the opening of the outer tube group, and the fixing ring is sleeved over an end of the motor group.

6. The modular electric linear actuator facilitating assembly and disassembly according to claim 1, wherein through holes corresponding to the through holes of the sleeve ring are further provided on two sides of the position of the opening of the outer tube group, and through holes corresponding to the through holes of the fixing ring are provided at an end of the motor group.

* * * * *